United States Patent
Stavely et al.

(10) Patent No.: US 7,222,198 B2
(45) Date of Patent: May 22, 2007

(54) SYSTEM FOR TRANSFERRING DATA BETWEEN DEVICES BY MAKING BRIEF CONNECTION WITH EXTERNAL CONTACTS THAT EXTEND OUTWARDLY FROM DEVICE EXTERIOR

(75) Inventors: Donald J. Stavely, Windsor, CO (US); Mark John Bianchi, Fort Collins, CO (US); Norman Conrad Pyle, Greeley, CO (US); Angelica Quintana, Rio Rancho, NM (US); Wilfred Francis Brake, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 10/436,588

(22) Filed: May 13, 2003

(65) Prior Publication Data

US 2004/0230707 A1 Nov. 18, 2004

(51) Int. Cl.
*G06F 13/00* (2006.01)
*G06F 3/00* (2006.01)

(52) U.S. Cl. .............................. 710/33; 710/9; 710/10; 710/8; 710/72; 710/74; 710/73

(58) Field of Classification Search .............. 710/8–10, 710/33, 72–74
See application file for complete search history.

(56) References Cited

U.S. PATENT DOCUMENTS

| | | | | |
|---|---|---|---|---|
| 5,815,205 A | * | 9/1998 | Hashimoto et al. | 348/373 |
| 6,061,089 A | * | 5/2000 | Tonkin et al. | 348/211.6 |
| 6,751,691 B1 | * | 6/2004 | Douglas | 710/73 |

FOREIGN PATENT DOCUMENTS

| | | |
|---|---|---|
| JP | 03-106118 A | 5/1991 |
| JP | 04-138552 A | 5/1992 |
| JP | 07-183791 A | 7/1995 |
| JP | 07-273748 A | 10/1995 |
| JP | 11-202991 A | 7/1999 |
| JP | 2001-022705 A | 1/2001 |
| JP | 2003-046919 A | 2/2003 |
| WO | WO 98/39739 | * 9/1998 |

* cited by examiner

*Primary Examiner*—Tammara Peyton

(57) ABSTRACT

Disclosed are systems and methods for transferring data. In one embodiment, a system and method pertain to configuring a first device to send data, touching an external contact of the first device to an external contact of a second device, and transmitting data from the first device to the second device via the touching contacts.

14 Claims, 8 Drawing Sheets

SYSTEM FOR TRANSFERRING DATA BETWEEN DEVICES BY MAKING BRIEF CONNECTION WITH EXTERNAL CONTACTS THAT EXTEND OUTWARDLY FROM DEVICE EXTERIOR

BACKGROUND

Previously, data was only transferred between devices using wired connections. For instance, multiconductor cables may be connected between two devices to transfer data from one device to the other. More recently, however, more sophisticated methods for transferring data have been devised. For example, various wireless communication protocols, such as Bluetooth™ and IrDA (Infrared Data Association), have been developed that are intended to simplify communications between devices by doing away with the need for wires or cables.

Although wireless communications do facilitate communication without wires or cables, contrary to the intent behind the creation of wireless schemes, wireless communications can create confusion and/or irritation for the common device user. For instance, if two devices, say a desktop computer and a personal digital assistant (PDA), are Bluetooth™-enabled, the devices may automatically begin communicating with each other when one device is brought into proximity with the other. Although such automated connection may be appreciated by more savvy users, the typical user may be confused as to why or how such communications began. Furthermore, such a user may be concerned about what types of communications are being had between the devices and, in some cases, unintentional data transfer from one device to another may occur (e.g., synchronization of email messages). Therefore, such automation can result in a perceived lack of control for the user.

Aside from the above-noted concerns, wireless communication is unattractive from a cost standpoint. Specifically, the radio frequency (RF) transmitting and receiving components typically used in current wireless communication schemes add expense to the devices that comprise them. Moreover, relatively large amounts of power are required to drive such components. Although power consumption may not be of great concern for devices that are connected to a home or office alternating current (AC) supply, power consumption is very important for portable devices. Yet another limitation of wireless communications is the availability of bandwidth that may be used to transfer data, as well as the speed with which such data can be transferred using that bandwidth.

SUMMARY

Disclosed are systems and methods for transferring data. In one embodiment, a system and method pertain to configuring a first device to send data, touching an external contact of the first device to an external contact of a second device, and transmitting data from the first device to the second device via the touching contacts.

BRIEF DESCRIPTION OF THE DRAWINGS

The disclosed systems and methods can be better understood with reference to the following drawings. The components in the drawings are not necessarily to scale.

DETAILED DESCRIPTION

As identified in the foregoing, sophisticated data transfer methods, such as wireless communication, are intended to simplify data transfer for the user, but create other problems for the user, one of which being confusion and/or irritation in regard to communications that automatically occur between wireless-enabled devices. As is described in this disclosure, however, highly efficient and intuitive data transfer can be achieved by providing both the sending and the receiving device with an external contact that, when touched to another such contact, facilitates delivery of data from the sending device to the receiving device.

In such a communications scheme, relatively large amounts of data may be transferred between devices in a seemingly instantaneous manner from the perspective of the user. Moreover, this transfer speed can be achieved using relatively simple circuitry, thereby reducing both device cost and device power consumption.

Disclosed herein are embodiments of systems and methods for transferring data. Although particular embodiments are disclosed, these embodiments are provided for purposes of example only to facilitate description of the disclosed systems and methods. Accordingly, other embodiments are possible.

Figure 1A:
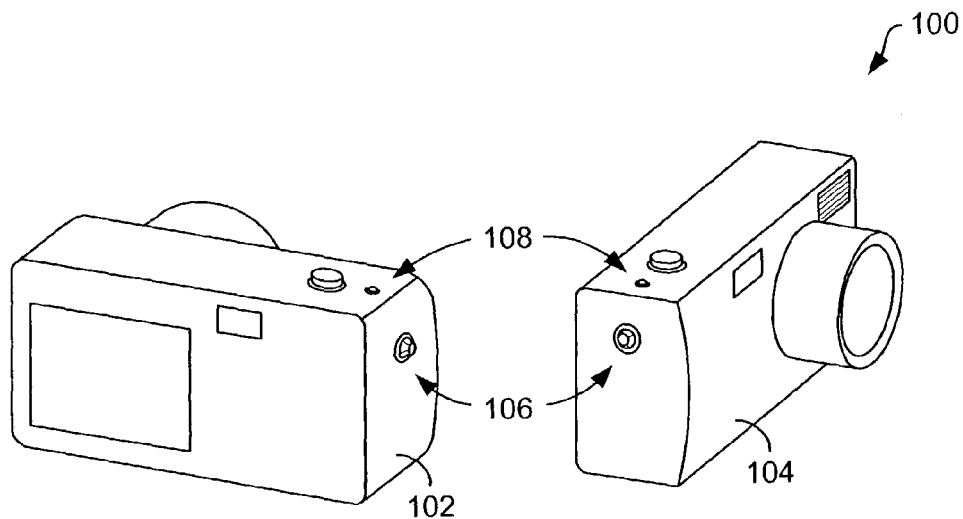
FIG. 1A is an embodiment of a system with which data can be transferred between devices.

Referring now to the drawings, in which like numerals indicate corresponding parts throughout the several views, FIG. 1A illustrates an embodiment of a system 100 with which data may be transferred between devices. As indicated in the figure, the system comprises a first device 102 and a second device 104. In the example of FIG. 1A, both devices 102, 104 comprise a digital camera. As will be apparent from the following discussion, however, each device 102, 104 may generally comprise any device that can either store and transmit data, or receive and store data. Therefore, other examples for the devices 102, 104 include a desktop personal computer (PC), MacIntosh™ computer, notebook computer, tablet computer, personal digital assistant (PDA), mobile telephone, and the like. In some embodiments, one or both of the devices 102, 104 comprise a portable and/or handheld device so as to facilitate sharing of data between such devices without the need for data cables or wireless communication.

Figure 1B:
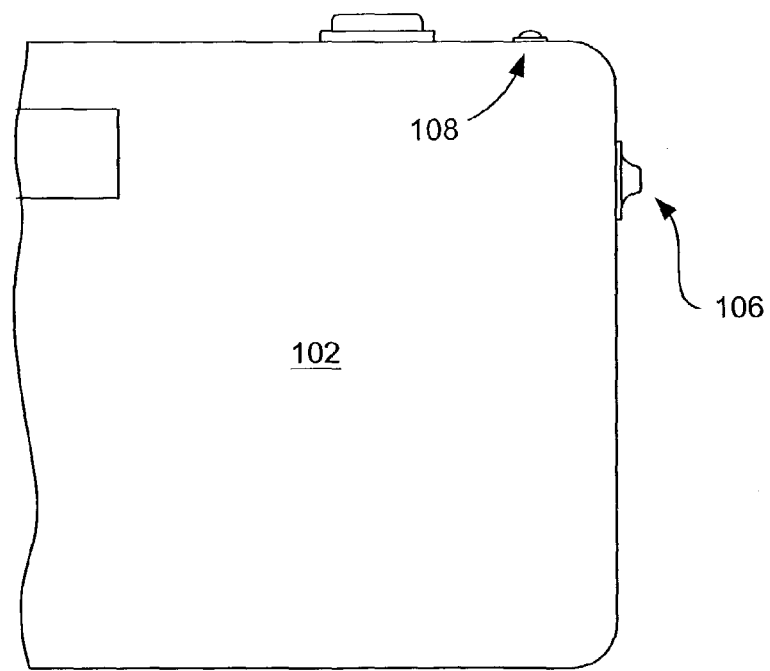
FIG. 1B is a detail view of a device shown in FIG. 1A.

Irrespective of the particular configuration of the devices 102, 104, each is provided with an external contact 106, with which data can be transmitted to and/or received from another device. As shown most clearly in FIG. 1B, which illustrates a portion of the device 102 in greater detail, the external contact 106 of the embodiment shown in FIG. 1 is a male contact that extends outwardly from the body of the device so as to facilitate convenient touching of the contact to another contact (of like or different configuration). Therefore, as indicated in FIGS. 1A and 1B, the contacts 106 may be formed as metal nubs or other such protuberances. Although male contacts are illustrated in the figures and have been identified explicitly herein, alternative arrangements are feasible. For instance, in situations in which one device typically will be the transferor of data and the other device typically will be the transferee (i.e., recipient) of data, the transferring device may have a generally male contact and the receiving device may have a generally female contact, or vice versa. In any case, the contacts 106 are normally positioned so as to facilitate touching of the contacts together.

In addition to the external contacts 106, each device 102, 104 may also include an indicator 108 that is used to convey information as to the transfer of data from one device to the other. In the embodiment of FIGS. 1A and 1B, this indicator 108 comprises a light-emitting element, such as a light-emitting diode (LED), which is provided on the body of each device 102, 104 generally adjacent the contact 106. Use of the indicators 108, and the manner in which they convey information regarding data transfer, are described below.

Figure 2:
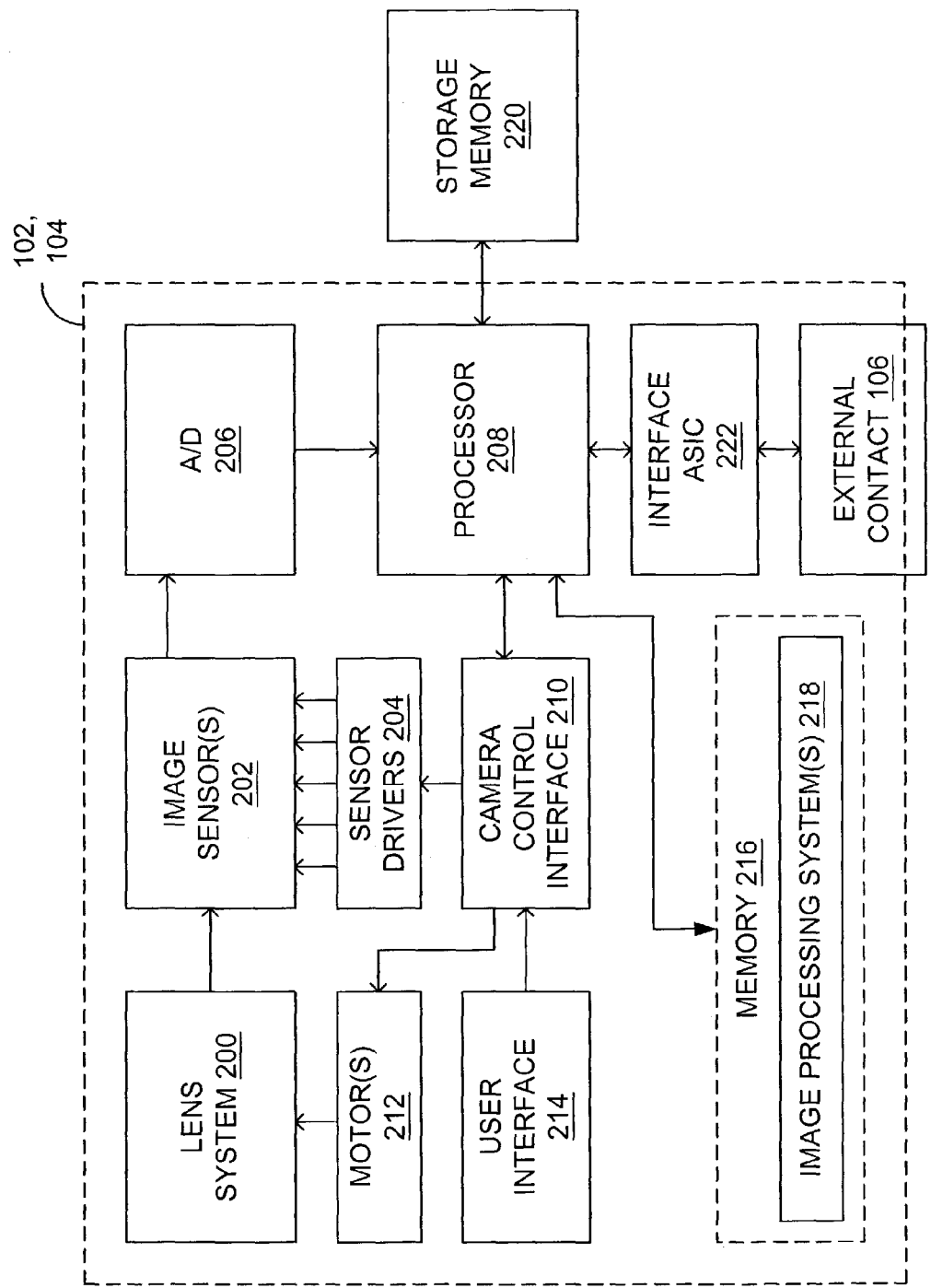
FIG. 2 is an embodiment of the architecture of the devices shown in FIG. 1A.

FIG. 2 illustrates an embodiment of the architecture for either of the devices 102, 104 shown in FIG. 1A. Therefore, in the following discussion, it is presumed that the device described is capable of both transmitting and receiving data. More specifically, illustrated is an example architecture of a digital camera that is configured to facilitate data transfer. Therefore, for the remainder of the discussion of FIG. 2, it is assumed that the device is a "camera."

As indicated FIG. 2, the camera 102, 104 includes a lens system 200 that conveys images of viewed scenes to one or more image sensors 202. By way of example, the image sensors 202 comprise charge-coupled devices (CCDs) that are driven by one or more sensor drivers 204, or complimentary metal oxide semiconductor (CMOS) sensors. The analog image signals captured by the sensors 202 are then provided to an analog-to-digital (A/D) converter 206 for conversion into binary code that can be processed by a processor 208.

Operation of the sensor drivers 204 is controlled through a camera control interface 210 that is in bi-directional communication with the processor 208. Also controlled through the interface 210 are one or more motors 212 that are used to control operation of the lens system 200 (e.g., to adjust focus, zoom, aperture, or shutter). Operation of the camera control interface 210 may be adjusted through manipulation of a user interface 214. The user interface 214 comprises the various components used to enter selections and commands into the camera 102, 104 such as a shutter-release button and various control buttons provided on the camera.

The digital image signals are processed in accordance with instructions from the camera control interface 210 and the image processing system(s) 218 stored in permanent (non-volatile) device memory 216. Processed images may then be stored in storage memory 220, such as that contained within a removable solid-state memory card (e.g., Flash memory card).

As is depicted in FIG. 2, the external contact 106 is placed in electrical communication with the processor 208 via an interface application specific integrated circuit (ASIC) 222. An example embodiment for this ASIC 222 is provided with reference to FIG. 3.

Figure 3:
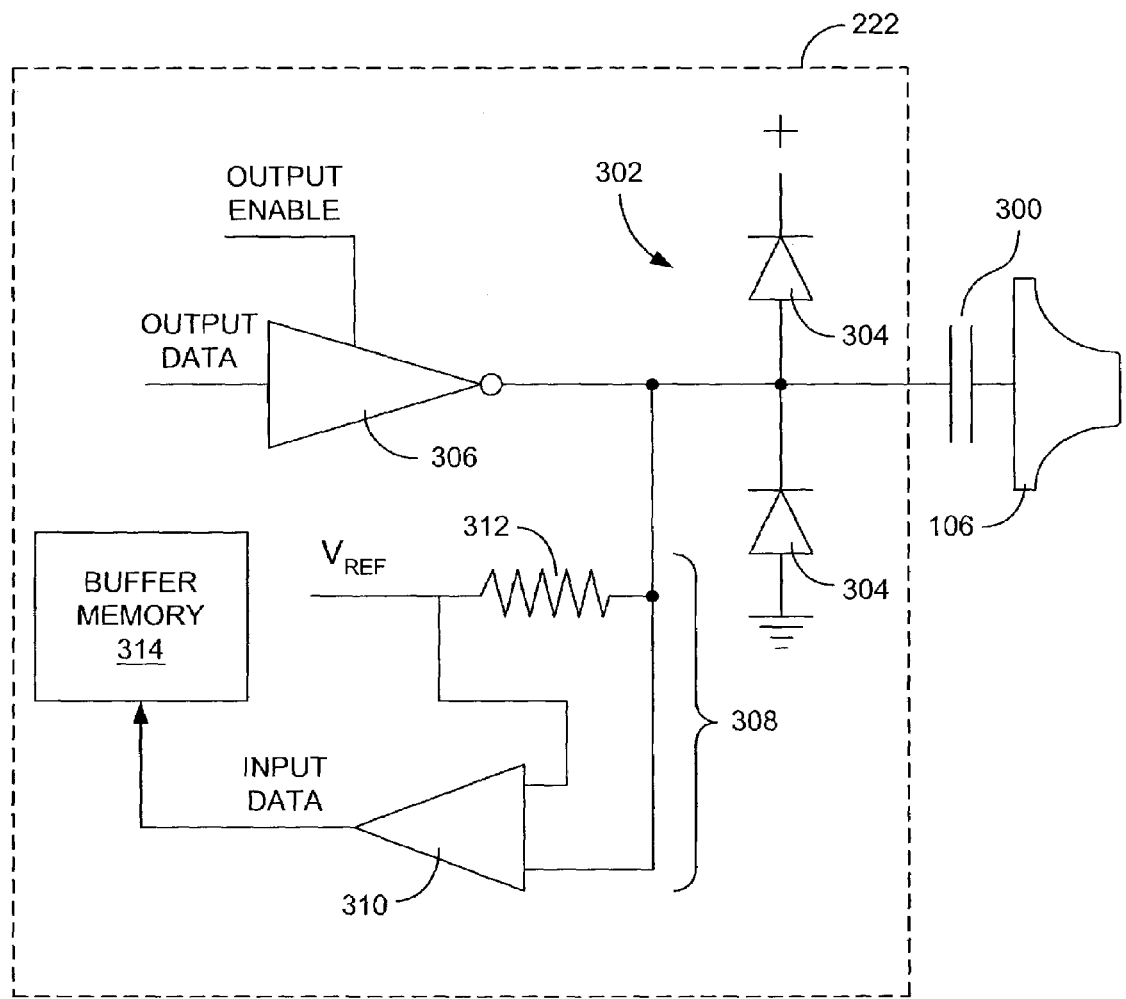
FIG. 3 is a schematic diagram of an embodiment of an integrated circuit that can be used in the architecture of FIG. 2.

FIG. 3 is a schematic diagram of an embodiment for the interface ASIC 222 identified in FIG. 2. As shown in FIG. 3, the ASIC 222 is connected to the external contact 106 via a capacitor 300 so as to provide capacitive coupling between the ASIC and the contact that protects the ASIC and the processor 208 (FIG. 2) from damage when the contact is grounded or connected to a DC potential (e.g., through unintended contact with a metal object). Additional protection is provided by an electrostatic discharge (ESD) circuit 302 that diverts voltage surges (whether negative or positive) away from the ASIC components using one or more protection diodes 304. If such a voltage surge is positive, it is diverted to the $V_{CC}$ node (indicated by "+"). If such a voltage is negative, it is diverted to ground.

The ASIC 222 further includes an output driver 306 that is used to drive data to another device via the external contact 106. By way of example, the output driver 306 comprises a tristate driver that is configured to operate in three states, namely a first state in which a logical "1" is driven, a second state in which a logical "0" is driven, and a third state in which no values are driven. Toggling between either of the first two states and the third state may be achieved through use of an output enable signal (see FIG. 3). Such a configuration facilitates the receipt of data (i.e., input data) with a comparator circuit 308 that is electrically connected to the output driver 306. In the embodiment shown in FIG. 3, the comparator circuit 308 includes a comparator 310 and a resistor 312. In use, input received from another device via the external contact 106 (when the output driver 306 is disabled) is compared with a reference voltage $V_{REF}$ so that the data can be correctly interpreted. Note that the input is AC-coupled, and the restored DC voltage is provided through resistor 312. Thus, the received data swings above and below reference voltage $V_{REF}$. Comparator 308 converts the analog waveform to binary data. Through such comparison, the input signal is cleaned and the data (i.e., "1s" and "0s") it contains may be identified. DC-free coding may be advantageously used for the data due to the AC-coupling of the circuit. This coding technology is well understood in the data storage and communications industry. Note also that comparator 308 may add some hysteresis to its comparison of the input to the reference voltage. This prevents random noise from being converted to data in the absence of an AC signal in.

In addition to the above-identified components, the ASIC 222 further includes buffer memory 314 that is used to quickly cache received data to enable high data transfer rates.

Figure 4:
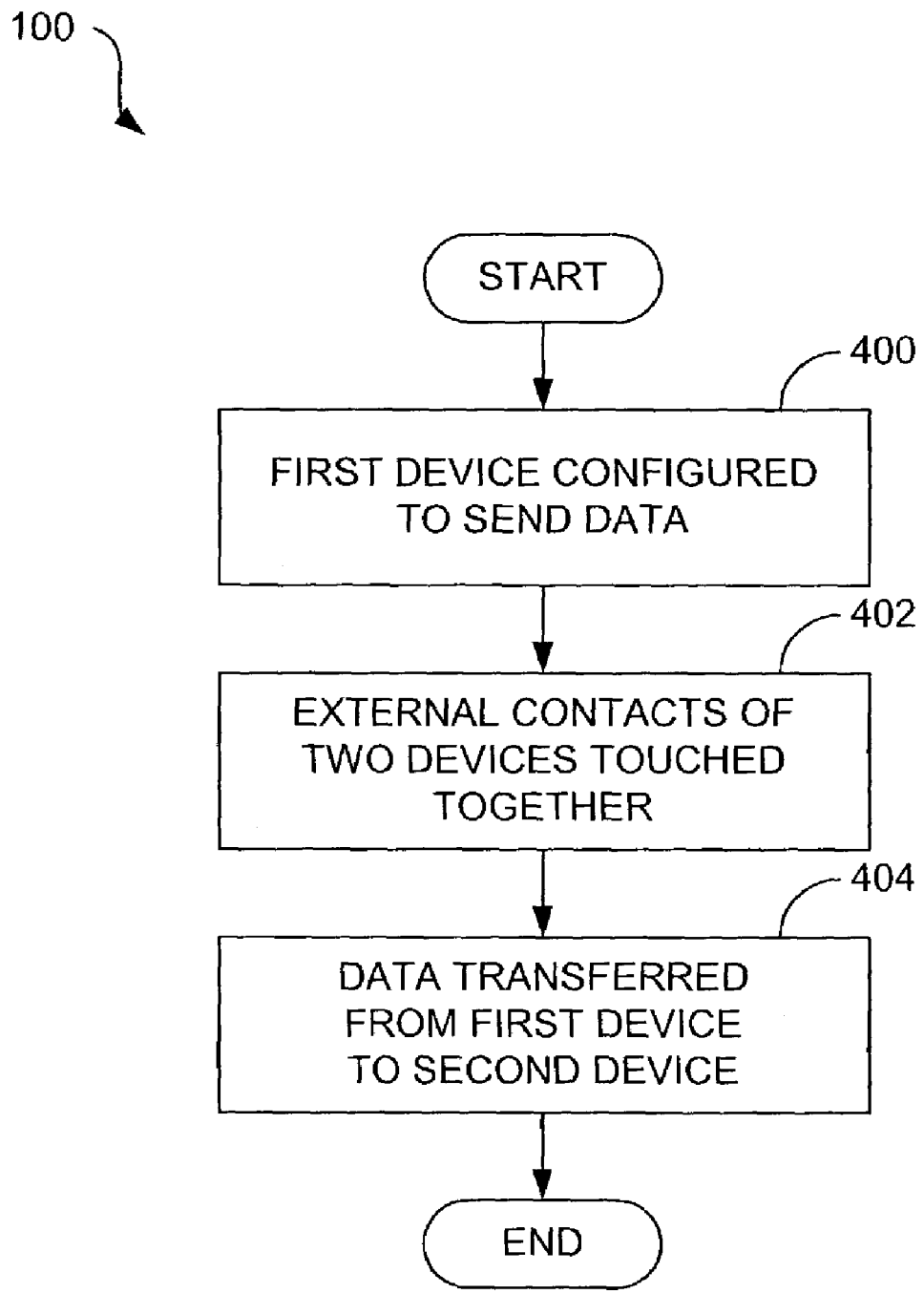
FIG. 4 is a flow diagram illustrating an embodiment of a method for transferring data.

FIG. 4 is a flow diagram illustrating an embodiment of a method for transferring data. In particular, FIG. 4 provides an overview of a process for transferring data from a first device to a second device. It is noted that any process steps or blocks described in the flow diagrams of the present disclosure may represent modules, segments, or portions of program code that includes one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Beginning with block 400, the first device is configured to send data to the second device. The configuration involved may depend upon the circumstances, but typically includes placing the first device in a transmit data mode in which the device is prepared to transmit data to another device. Configuring the device to send data may further include identifying data that is to be transmitted using a device interface (e.g., display and control buttons). The manner in which data identification is achieved may depend upon the nature of the underlying device that is sending the data. If the device comprises a camera, the data (i.e., images) to be sent can be identified by the user, for example, by scrolling through images stored in the camera (or its removable memory card) and tagging one or more images for transmission. Alternatively, identification may simply comprise scrolling through images until the image that is desired to be transmitted is shown in a display of the camera, thereby indicating an intent to transmit the image.

In situations in which the device is not a camera (e.g., if the device is a PDA, mobile telephone, or notebook computer), identification of data may be accomplished through more conventional means by, for instance, scrolling through file directories and/or drop down menus and identifying which of several listed files is/are to be transmitted.

Figure 5A:
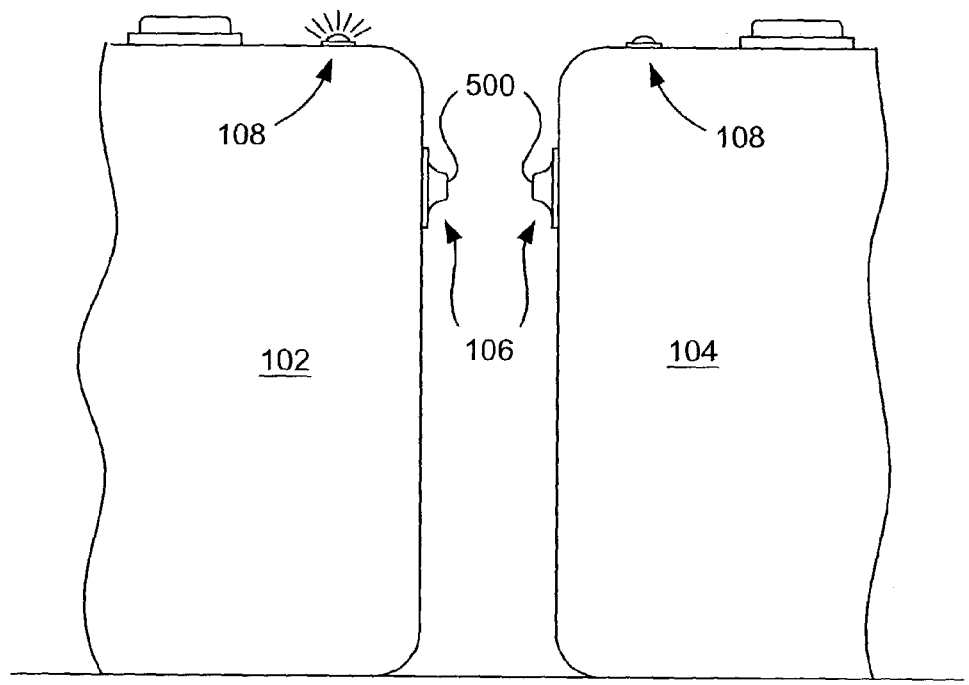
FIGS. 5A and 5B illustrate the touching of contacts of two devices for the purpose of transferring data.
Figure 5B:
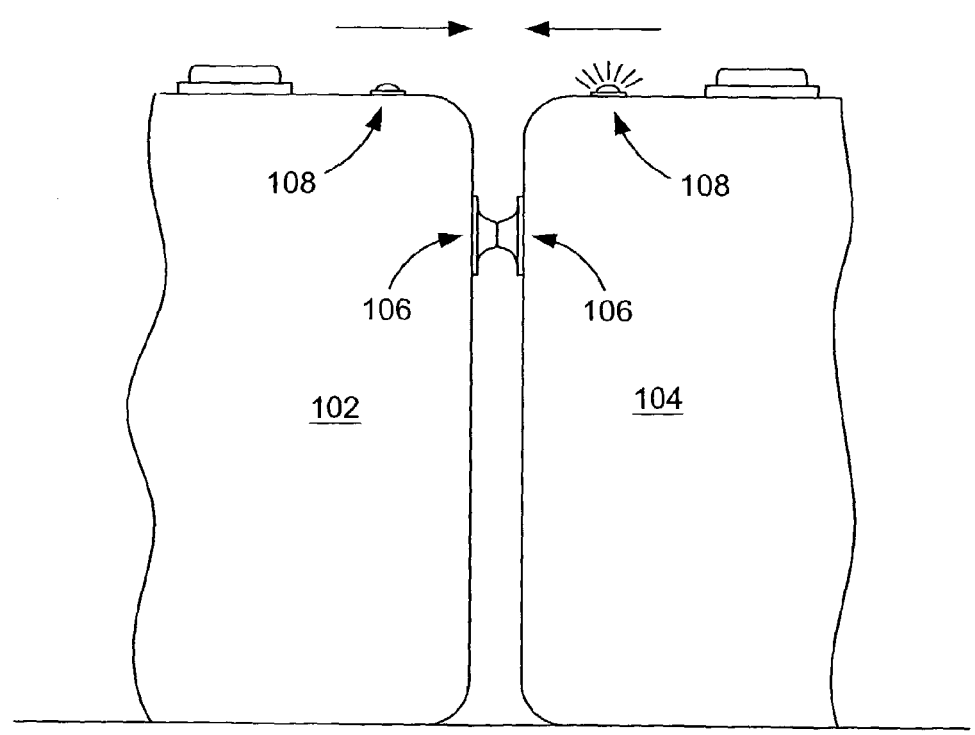

Next, with reference to block 402, the external contacts of the first and second devices are touched together. This touching can be achieved by simply moving the devices toward each other until contact is made between the contacts 106 as indicated in FIGS. 5A and 5B. As shown in FIG. 5B, the male contacts 106 may include a flat 500 that facilitates positive contact between the contacts when brought together. Moreover, the contacts 106 may be positioned so as to enable touching of the contacts of two devices when one or both of the devices are slid across a smooth surface such as a table top (see FIGS. 5A and 5B).

Once the external contacts have been touched together, data is transferred from the first device to the second device, as indicated in block 404. As is discussed in greater detail below, all data can be transferred in this manner even if the external contacts are touched together for a brief period of time (e.g., a fraction of a second) due to the great speed with which the data is transmitted. Moreover, all data may be transferred even if the touching of the contacts is not perfectly continuous (i.e. the connection is noisy) due to the high transmission speed and to the redundancy of transmission (described below).

Figure 6A:
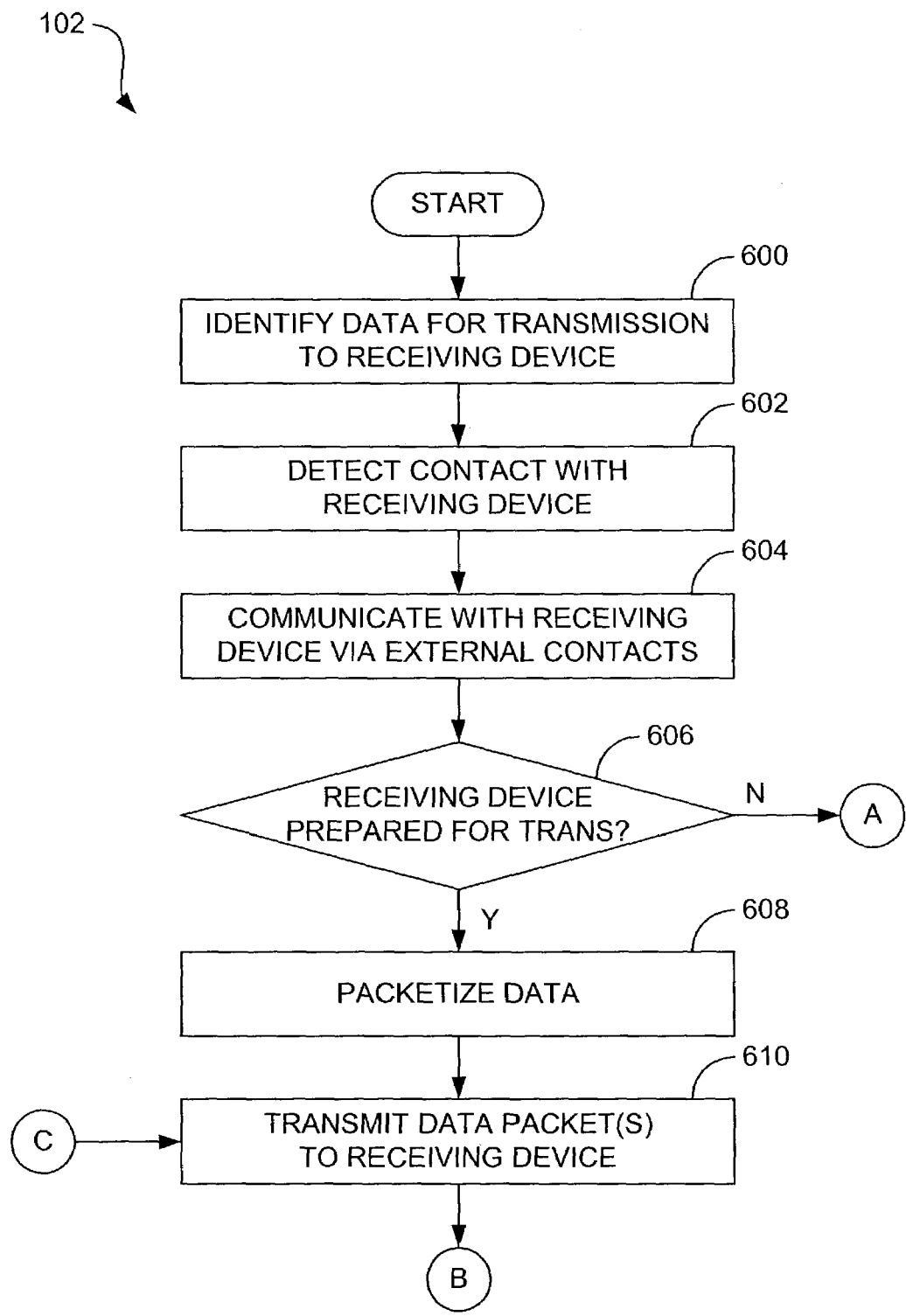
FIGS. 6A and 6B provide a flow diagram illustrating an embodiment of a method for transmitting data from one device to another device.
Figure 6B:
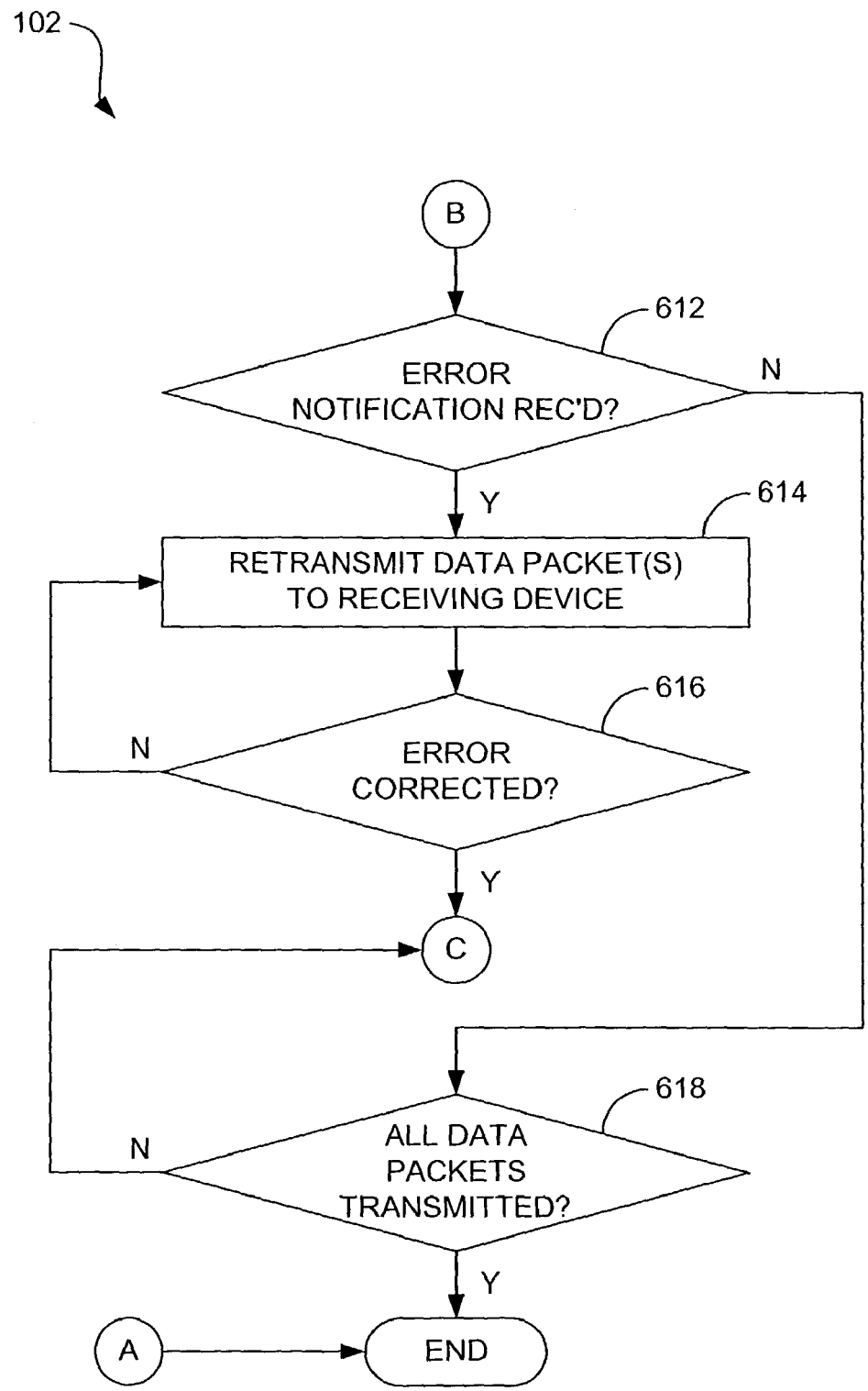

FIGS. 6A and 6B describe an embodiment of a method for transmitting data from one device (i.e., a transmitting device) to another device (i.e., a receiving device). In this example, the transmitting device is assumed to be the first device 102 of FIG. 1A and the receiving device is assumed to be the second device of that figure. In any case, however, data to be transmitted is identified by the transmitting device, as indicated in block 600 of FIG. 6A. As described above with reference to FIG. 4, the data to be 5 transmitted may have first been identified by the user using some form of user interface (e.g., display, control buttons, etc.). In some embodiments, an indicator (e.g., indicator 108 in FIGS. 1A and 1B) is used to indicate to the user that the data to be transmitted has been identified and currently resides within the transmitting device. Such a condition is illustrated in FIG. 5A, which depicts the indicator 108 as being illuminated.

Once the data has been identified, the transmitting device detects contact with the receiving device, as indicated in block 602, due to the user bringing the external contacts of the two devices together (see FIG. 5B). By way of example, touching of the external contacts may be detected by a "handshake" process. The transmitting device may begin periodically transmitting a "request to send" message, while listening for a return message from the receiving device. When the receiving device recognizes the "request to send" once electrical contact is made, it responds with a "ready to receive" message. When the transmitting device recognizes the "ready to receive" message, the device is ready to send data.

After continuity between the two devices has been detected, the transmitting device communicates with the receiving device via the external contacts, as indicated in block 604. These communications comprise any initial "handshaking" that is necessary to coordinate and manage the transmission of data from the transmitting device to the receiving device. Accordingly, such communications may comprise two-way communications in which the transmitting device queries the receiving device whether it is capable of and/or prepared to receive data, what protocols are to be used to transmit the data, the speed at which to transmit the data, and so forth.

The communications between the two devices can take several different forms. In one variant, a half-duplex communication scheme is used in which bi-directional communications are possible, but where such communications are a sequence of one-way communications. In such a communication scheme, the communication channel (i.e., the communication path comprising the external contacts) is treated like a one-way channel and the devices communicate with each other in an alternating fashion so that only one device transmits at any given time. This alternative has the advantage of being a "baseband" method that does not require extensive analog or RF circuitry.

In another variant, a full-duplex communication scheme is used in which contemporaneous bi-directional communications are possible. Such a communication scheme may be implemented using a dual spectrum comprising one forward channel frequency and one reverse channel frequency. Alternatively, spread spectrum technology such as code division multiple access (CDMA), time division multiple access (TDMA), frequency hopping, and so forth may be used. In yet a further variant, a simplex communication scheme is used in which only one device transmits to the other. In such a scheme, no feedback is provided to the transmitting device regarding the success, or failure, of the transmission.

Due to the initial communications described above, the transmitting device can, as indicated in decision block 606, determine whether the receiving device is prepared to receive transmitted data. If not, data transfer cannot occur at this time, and flow is terminated for this transfer session (FIG. 6B). If, on the other hand, the receiving device is prepared for data transfer, flow continues to block 608 at which the data to be transmitted is packetized by the transmitting device. Although packetization is not required, it is useful given that the connection between the external contacts is relatively noisy, i.e. perfectly continuous physical contact between the external contacts for the duration of the data transmission may not be achieved because the contacts are not configured for positive mating or interlocking. Accordingly, packetization is assumed in the embodiment of FIGS. 6A and 6B.

Each data packet typically comprises a portion of the data (e.g., one record of a file, or one tile of an image) to be transmitted as well as information that is pertinent to the transmission and/or reconstruction of the transmitted data from the data packets. Such information can be contained within a packet header and may include, for example, a packet number. In such a case, the receiving device can determine which packets did not arrive, or arrived in a corrupted condition.

With reference next to block 610, one or more data packets are transmitted from the transmitting device to the receiving device. Such transmission occurs at a very high data rate in that a direct link, as opposed to a wireless "connection," is provided between the two devices. Therefore, bandwidth is not a constraint and data may be transmitted in a baseband scheme using relatively little power. Even assuming overhead of about 50% associated with packetizing the data and error correction, data rates of 100 megabits per second (mbps) or more are feasible. In such a case, a 1 megabyte (MB) image can be transmitted in under 0.2 seconds. Therefore, individual files may be transmitted so quickly that their transmission appears nearly instantaneous from the perspective of the user. Notably, the buffer memory 314 facilitates such rapid transmission in that input data may be quickly stored in the buffer memory as opposed to random access memory (RAM) and/or permanent memory elsewhere in the device.

In bi-directional communication schemes (e.g., half or full-duplex), one or more data packets may be transmitted and feedback as to whether uncorrupted versions were received can be returned from the receiving device. Operation in this manner allows the transmitting device to determine which data packets must be retransmitted to the receiving device.

With reference next to decision block 612 of FIG. 6B, the transmitting device determines whether feedback in the form of an error notification has been received from the receiving device, thereby indicating that one or more data packets were not received or were not received in proper condition. If not, i.e. if no such notification is received, flow continues down to decision block 618 described below. If, however, an error notification is received, flow continues to block 614. Such an error notification may comprise, for instance, a message transmitted from the receiving device to the transmitting device indicating that one or more particular packets were not properly received. In such a case, the transmitting device retransmits one or more packets to the receiving device to ensure that all transmitted packets are properly received by the receiving device. At this point, the transmitting device can determine whether the error has been corrected, as indicated in decision block 616. This determination is made, for instance, in relation to messages transmitted by the receiving device to the transmitting device. If the error has not been corrected, the transmitting device can again retransmit data packets as indicated in block 614. Assuming that the error is corrected, however, flow continues back to block 610 of FIG. 6A at which new data packets are transmitted to the receiving device.

If no error notifications are received, flow continues to decision block 618 of FIG. 6B at which the transmitting device determines whether all data packets that represent the data to be transmitted (e.g., file) have been transmitted. If so, flow for the transmission session is terminated. When all data has been transmitted, the indicators provided on the transmitting and receiving devices may be used to indicate this condition to the user. For instance, as described above, an indicator 108 of the transmitting device may be illuminated to indicate to the user that the data to be transmitted resides on the transmission device as shown in FIG. 5A. Once the data transmission is completed, however, this indicator 108 may be turned off and the indicator 108 of the receiving device may be turned on as shown in FIG. 5B. In such an indication scheme, the indicators 108 represent or imitate movement of the data. Therefore, the user obtains the impression that the user can "see" the data pass from one device to the other, thereby providing highly intuitive feedback to the user as to the completion and success of the data transfer.

Returning to decision block 618, if one or more data packets have not yet been transmitted, flow returns to block 610 of FIG. 6A and data packet(s) is/are again transmitted to the receiving device. Flow continues from that point in the manner described above until all such data packets have been successfully transmitted.

Figure 7:
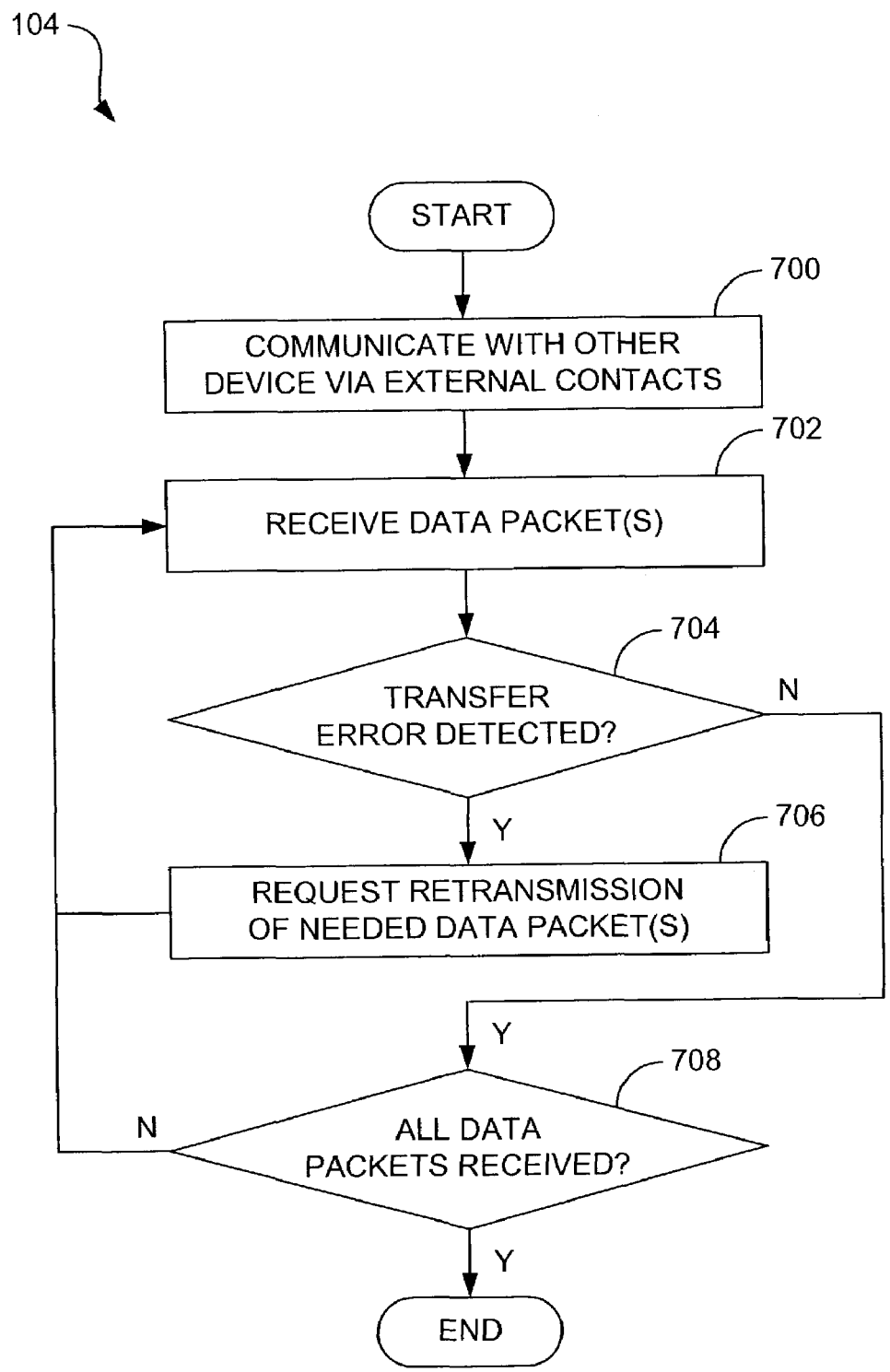
FIG. 7 is a flow diagram illustrating an embodiment of a method for receiving data from a device.

FIG. 7 describes an embodiment of a method for receiving data that has been sent from a transmitting device. In this embodiment, the receiving device may comprise the second device 104 from FIG. 1A, and the transmitting device may comprise the first device 102 from that figure. In any case, however, the receiving device communicates with the transmitting device, as indicated in block 700 when an initial communication is sent by the transmitting device. As described above with reference to FIGS. 6A and 6B, the communications initially sent from the receiving device may pertain to any "handshaking" that is required and may contain information as to whether the receiving device is capable of and/or prepared to receive data, what protocols the receiving device uses, the speed at which the receiving device can receive data, and so forth.

Once these initial communications have been completed, the receiving device receives data packets, as indicated in block 702. During this receipt of data packets, the receiving device monitors the data transfer process to determine, as indicated in decision block 704, whether a transfer error is detected. By way of example, such an error comprises receipt of a corrupted data packet or failure to receive a data packet. If no such errors occur, flow continues down to decision block 708 described below. If an error does occur, however, flow continues to block 706 at which the receiving device requests retransmission of any needed data packets. Once such a request is made, the receiving device again receives data packets (block 702).

Assuming that no transfer errors are detected or any such errors are corrected, flow continues to decision block 708 at which it is determined whether all data packets have been received. This determination can be made, for instance, in relation to a "end transmission" message received from the transmitting device, or in relation to information received from the transmitting device as to how many packets in total that are being sent. In either case, if all packets have been properly received, flow is terminated. If not, flow returns to block 702, and any remaining data packets are received.

What is claimed is:

1. A device, comprising:
    a processor;
    an external contact that is provided on the exterior of the device, the external contact extending outwardly from the device exterior and being configured to make brief contact with an external contact provided on the exterior of a second device without positive coupling between the external contacts or the devices to facilitate transmission of data to the second device, the second device being a digital camera, a desktop computer, a notebook computer, a tablet computer, a personal digital assistant (PDA), or a mobile telephone; and
    an interface that connects the processor and the external contact.

2. The device of claim 1, wherein the external contact is a male contact.

3. The device of claim 1, wherein the external contact is formed as a metal nub.

4. The device of claim 1, wherein the interface comprises an output driver.

5. The device of claim 1, wherein the interface comprises a comparator circuit.

6. The device of claim 5, wherein the interface comprises buffer memory in electrical communication with the comparator circuit.

7. The device of claim 1, further comprising an electrostatic discharge (ESD) circuit.

8. The device of claim 1, further comprising a capacitor provided between the external contact and the interface.

9. The device of claim 1, wherein the interface comprises an application specific integrated circuit (ASIC).

10. The device of claim 1, wherein the device is a portable device.

11. The device of claim 1, wherein the device is a digital camera.

12. The device of claim 1, wherein the second device is a digital camera.

13. The device of claim 1, wherein the interface is configured to transmit data to the second device via the external contacts in a fraction of a second such that the data can be transmitted between the devices when the external contacts are simply touched together for only a brief period of time.

14. The device of claim 1, wherein the interface is configured to transmit data from the device to the second device via the external contacts at a rate of approximately 100 megabits per second such that data transmission appears to be nearly instantaneous to a user.

* * * * *

UNITED STATES PATENT AND TRADEMARK OFFICE
CERTIFICATE OF CORRECTION

| | | |
|---|---|---|
| PATENT NO. | : 7,222,198 B2 | |
| APPLICATION NO. | : 10/436588 | |
| DATED | : May 22, 2007 | |
| INVENTOR(S) | : Donald J. Stavely et al. | |

It is certified that error appears in the above-identified patent and that said Letters Patent is hereby corrected as shown below:

In column 2, line 52, delete "MacIntosh$^{TM}$" and insert -- MacIntosh$^{TM}$ --, therefor.

In column 5, line 46, after "be" delete "5".

Signed and Sealed this

Nineteenth Day of May, 2009

JOHN DOLL
*Acting Director of the United States Patent and Trademark Office*